United States Patent Office 2,880,185
Patented Mar. 31, 1959

2,880,185

BLENDS OF RUBBERY MATERIALS WITH RESINOUS STYRENE-BUTADIENE COPOLYMERS

Geoffrey Philip Lee, Hertford, England, assignor to Imperial Chemical Industries Limited, London, England, a corporation of Great Britain No Drawing. Application December 5, 1955
Serial No. 550,865

Claims priority, application Great Britain
December 24, 1954

4 Claims. (Cl. 260—4)

This invention relates to compositions comprising mixtures of resinous butadiene/styrene copolymers and rubbery butadiene/methyl methacrylate copolymers.

Various synthetic resinous materials have been proposed for use as filling agents for natural and synthetic rubber. In particular the resinous copolymers of styrene and butadiene 1,3, that is those obtained by polymerizing monomer mixtures containing more than 50% by weight of styrene, are of value in replacing carbon black as a reinforcing agent in natural rubber to give a product which when vulcanized has improved properties for particular purposes. Certain natural rubber compositions comprising the resinous copolymers of styrene and butadiene 1,3 have many of the desirable properties of leather but have much better wearing properties than leather. The compositions have the further advantage that by avoiding the use of carbon black they can be made in lighter colours, and also that vulcanized compositions can be obtained having a lower density for a given hardness than can be obtained using conventional fillers for rubber compositions.

It has been found, however, that while the introduction of resinous copolymers of butadiene and styrene into natural rubber confers these important advantages, the resulting vulcanized composition has a low resistance to flex cracking; this is particularly so in shoe soling compositions. A method of measuring resistance to flex cracking is described in Specification No. 7/54 published by The British Boot, Shoe and Allied Trades Research Association. This low resistance to flex cracking can be considerably improved by replacing some of the natural rubber by a rubbery copolymer of butadiene and styrene, but when this is done it is found that the hardness tends to be reduced. We have now found that if some of the natural rubber is replaced instead by a rubbery copolymer of butadiene 1,3 and methyl methacrylate, the vulcanized composition very surprisingly has the remarkably good combination of high hardness, high modulus at 100% extension, extremely good resistance to flex cracking, and extremely good wearing properties, such as is not normally obtainable with the recipes used hitherto in preparing resin/rubber shoe soling compositions.

Accordingly the present invention comprises a composition for reinforcing natural rubber which composition comprises a mixture of (1) a resinous copolymer obtained by polymerizing a mixture having as the essential copolymerizable monomers butadiene 1,3 and styrene and containing at least 70% by weight of styrene based on the weight of the mixture of monomers, and (2) a rubbery copolymer obtained by polymerizing a mixture having as the essential copolymerizable monomers butadiene 1,3 and methyl methacrylate and containing at least 60% by weight of butadiene 1,3 based on the weight of the mixture of monomers. Our invention also comprises compositions comprising natural rubber and the copolymers comprising our reinforcing composition, whether prepared by mixing natural rubber with our composition, or whether by mixing natural rubber with the resinous and rubbery copolymers added separately. Our invention further comprises vulcanized materials prepared from compositions comprising natural rubber and said rubbery and resinous copolymers.

The relative amounts of said resinous and rubbery copolymers that are used to prepare the reinforcing composition will depend upon the nature of the copolymers themselves and the use to which the composition is to be put. To obtain the best reinforcement of natural rubber we prefer that the resinous copolymer should be prepared from a mixture of styrene and butadiene 1,3 containing from 75 to 95%, particularly between 83 and 87%, by weight of styrene. We also prefer that the rubbery copolymer should be prepared from a mixture of butadiene 1,3 and methyl methacrylate containing from 20% to 30%, particularly from 23 to 27%, of methyl methacrylate since these copolymers give the best resistance to flex cracking in the final vulcanized reinforced composition, combined with high tensile strength, high modulus, and a high hardness within the desired range.

The amount of the rubbery copolymer in the reinforcing composition is preferably from 25 to 150 parts by weight to each 100 parts by weight of the resinous copolymer, since compositions within this range when used to reinforce natural rubber give the desired improved resistance to flex cracking combined with good reinforcement of the natural rubber. To obtain the best combination of physical properties, however, we prefer that the reinforcing composition should contain from 33 to 100 parts by weight of the rubbery copolymer to each 100 parts by weight of the resinous copolymer.

The amount of our reinforcing composition that is blended with natural rubber will depend upon the use for which the final vulcanized material is intended. In general the most useful blends of our reinforcing composition with natural rubber are obtained when there are from 20 to 70, preferably 35 to 70, parts by weight of resinous copolymer to each 100 parts by weight of natural rubber and when the proportion of rubbery copolymer to resinous copolymer is within the limits hereinbefore described. For example, when our compositions are intended to be used after vulcanizing, as shoe soling materials, we prefer that the composition should comprise 100 parts of natural rubber with from 35 to 70 parts of said resinous copolymer and from 12 to 70 parts of said rubbery copolymer.

Our reinforcing composition is preferably prepared by blending an aqueous dispersion of said resinous copolymer with the required amount of an aqueous dispersion of said rubbery copolymer because a very intimate mixture of the copolymers is thereby obtained. The blended copolymers may be isolated by known methods, e.g. spray drying or by coagulating the blend of dispersions, or if desired, the blended dispersions may be further blended with a natural rubber latex and the solids contained by this final blend isolated by known methods to give our composition of natural rubber and said copolymers. Our composition comprising natural rubber and said resinous and rubbery copolymers, may also be prepared by mixing natural rubber on rolls or in a masticating mixer with either the blend of resinous and rubbery copolymers, or by milling in each component separately.

The copolymers are preferably prepared by emulsion polymerization processes, which are well known in the art, in which the required amounts of monomers are polymerized when dispersed in an aqueous phase containing a dissolved emulsifying agent. The polymerization reaction is initiated by a catalyst, with if necessary a catalyst activator, and at a temperature of from about 0° C. to about 60° C. depending on the catalyst system used. The reaction is also preferably carried out in the presence of a polymerization modifier to control the processing properties of the copolymers.

Examples of emulsifying agents which may be used in the polymerisation process are, alkali metal salts of sulphonated or sulphated long-chain hydrocarbons and animal and vegetable fats and oils, water-soluble salts of sulphuric acid esters of fatty alcohols, i.e. alcohols corresponding to fatty acids of animal and vegetable fats and oils, and soaps. Examples of particular emulsifying agents include sodium lauryl sulphate, sodium oleyl sulphate, sodium cetyl sulphate, the sodium salt of sulphonated castor oil, the sodium salt of sulphonated or sulphated methyl oleate, sodium oleate, sodium palmitate, and sodium stearate. We prefer not to use the corresponding ammonium salts since in many cases they cause the reaction rate to be reduced.

The use of polymerization modifiers is well known in the manufacture of butadiene copolymers. They are mostly sulphur containing compounds, e.g. aliphatic mercaptans and organic polysulphites, e.g. dialkyl xanthogen disulphides, di(benzoic acid ester) tetra sulphides, tolyldisulphide and tolyltrisulphide. The preferred modifiers are primary, secondary or tertiary aliphatic mercaptans containing not less than six carbon atoms and not more than 18 carbon atoms. Mercaptans containing less than 6 carbon atoms tend to diffuse too rapidly to the surface of the monomer droplets during the polymerization process and to be used up too quickly, whilst mercaptans having more than 18 carbon atoms are less easily soluble in the monomer than our preferred mercaptans. The best results are obtained when mercaptans containing 12 carbon atoms are used, e.g. tertiary dodecyl mercaptan and also normal dodecyl mercaptan containing small amounts of higher mercaptans. The use of $C_6$ to $C_{18}$ mercaptans has the added advantage that when used in the presence of a water soluble oxygen yielding catalyst they serve to assist in promoting the copolymerization process. The amount of mercaptan modifier used is normally from about 0.05% to about 1% by weight of the monomer mixture, preferably from 0.1 to 0.4%. In general increasing the amount of modifier increases the softness of the copolymer and its solubility in organic solvents.

Examples of polymerization catalysts include water soluble oxygen yielding catalysts or reduction activation systems generally known as redox catalysts and comprising a mixture of an oxidizing agent and a reduction activating agent capable of reacting with the oxidizing agent. Examples of water soluble oxygen yielding catalysts include hydrogen peroxide and the alkali metal persulphates, e.g. potassium persulphate. An example of a redox catalyst is cumene hydroperoxide, or benzoyl peroxide, together with a heavy metal salt, and, if desired, sorbose or fructose. The amount of catalyst used depends upon the particular catalyst used, and also to some extent upon the degree of agitation used in mixing the emulsion during the reaction. For example, with potassium persulphate about 0.02 to 0.20% is the amount normally required based on the weight of the monomer mixture.

The temperature at which the copolymerization reaction is carried out depends upon the type of catalyst which is used. With water soluble oxygen yielding catalysts the reaction is preferably carried out at temperatures from 30° C to 60° C. since at temperatures below 30° C. the reaction tends to be too slow whilst at temperatures above 60° C. the reaction may be difficult to control. Redox catalysts are generally more active and it is often necessary to carry out the reaction at lower temperatures, e.g. down to about 5° C.; if the polymerization reaction is carried out at temperatures below 0°C. it is necessary to add to the polymerization mixture a compound which prevents freezing but which does not affect the polymerization rate, e.g. methanol.

It will be appreciated that small amounts of other copolymerizable monomers may be included in the mixtures of monomers hereinbefore described provided that the copolymers so obtained are substantially the same as copolymers obtained in the absence of such other copolymerizable compounds in their effects upon the physical properties of the final vulcanized material. Examples of such compounds are conjugated diolefines, e.g. isoprene and dimethyl butadiene, and compounds containing a single olefinic double bond, e.g. α-methyl styrene, vinyl carbazole, vinyl acetate, acrylonitrile, methyl acrylate, methacrylic acid and other nitriles, amides, and alkyl esters of α-methyl aliphatic carboxylic acids.

The copolymerization of butadiene 1,3 and methyl methacrylate may be taken to 80 to 85% completion to give good rubbery copolymers, whereas in the case of the rubbery copolymers of butadiene 1,3 and styrene, the reaction must be stopped at about 70 to 75% conversion since if the reaction is taken beyond this conversion the rubbery properties of the copolymer are adversely affected. Our use of the rubbery copolymers of methyl methacrylate and butadiene 1,3 has the further advantage therefore that a more efficient process is used in the production of the rubbery copolymer.

Other ingredients may be incorporated into our compositions at any convenient stage, for example, to the latices before coagulation, or by compounding on rolls or in a masticating mixer. Such other ingredients include for example, pigments, fillers, softeners, and vulcanization agents and accelerators. The final vulcanizable composition may be cured by known methods, e.g. by heating the composition in moulds at 153° C. under a pressure of about one ton per square inch for 30 minutes.

Our compositions are particularly suitable in applications where it is desirable that the material should have many of the properties of leather but where a material having better wearing properties than leather is desired, e.g. for shoe soles.

My invention is illustrated but in no way limited by the following examples in which all parts are by weight:

EXAMPLE I

*Preparation of copolymers*

164 parts of water, 0.10 part of potassium persulphate, 6 parts of sodium lauryl sulphate and 0.1 part of sodium hydroxide were fed into a stirred autoclave. 85 parts of styrene containing 0.1 part of lauryl mercaptan were then poured in and the autoclave sealed. The autoclave was purged three times with nitrogen, and 15 parts of butadiene 1,3 were blown in.

The dispersion was maintained at 50° C. for 11 hours at the end of which time a latex containing 98 parts of resinous copolymer was obtained.

A rubbery copolymer was prepared in a similar way by copolymerizing 25 parts of methyl methacrylate containing 0.3 part of dissolved lauryl mercaptan with 75 parts of butadiene 1,3 dispersed in 165 parts of water containing 5 parts of "Textile White Chips" (a commercial form of sodium stearate) and 0.3 part of potassium persulphate. The dispersion was maintained at 50° C. for 9 hours, at the end of which time the reaction was stopped by the addition of hydroquinone and the unreacted monomers were removed giving a latex containing 82 parts of rubbery copolymer.

Sufficiently large amounts of the resinous and rubbery copolymer latices were prepared to enable the following tests to be carried out.

*Preparation of copolymer latex blends*

Blends of the resinous and rubbery copolymer latices were prepared by mixing together the desired amounts of each latex, then coagulating each latex blend by the addition of aluminum sulphate solution, filtering and washing the copolymer blend, followed by drying in an air oven with a good circulation at 50° C.

The blends of the resinous styrene butadiene 1,3 copolymer and the rubbery methyl methacrylate butadiene 1,3 copolymer that were prepared contained 20% (Blend 1), 30% (Blend 2) and 42% (Blend 3) respectively of the rubbery copolymer.

*Mixing with natural rubber and physical properties of the cured material*

Each of the copolymer blends was mixed with natural rubber in varying amounts according to the following recipe, on a two roll low friction mill, the rolls of which were heated to 50° C.

|  | Parts |
|---|---|
| Pale crepe copolymer blend (Total Amount) | 140 |
| Calcium silicate filler | 100 |
| Pale coumarone resin, melting point 100–110° C. | 7 |
| Zinc oxide | 5 |
| Stearic acid | 1 |
| Antioxidant (the product obtained by condensing a mixture of 2:4 and 2:5 dimethyl phenol with butyraldehyde, and having a melting point of 45° C.) | 1 |
| Brown pigment | 1 |
| Dibenzthiazyl disulphide | 2 |
| Tetramethylthiuram disulphite | 0.15 |
| Paraffin wax | 1.5 |
| Sulphur | 3 |

Four compositions were prepared, designated Compositions A, B, C and D, and the natural rubber and copolymer blend content of the combined total of 140 parts in each composition was as follows:

| Composition | Natural Rubber, parts | Copolymer Blend, parts | Composition of Copolymer Blend | |
|---|---|---|---|---|
| | | | Resinous Copolymer, parts | Rubbery Copolymer, parts |
| A | 95 | 45 (Blend 1) | 36 | 9 |
| B | 85 | 55 (Blend 2) | 39 | 16 |
| C | 75 | 65 (Blend 3) | 38 | 27 |
| D | 70 | 70 (Blend 3) | 41 | 29 |

Each composition was cured by heating in a mould at 153° C. for 30 minutes under a pressure of 1 ton per square inch. Samples were subjected to various physical tests with the following results:

| Composition | Tensile Strength, lbs./sq. inch | Elongation at break, percent | 100% Modulus, lbs./sq. inch | B.S. Hardness, degrees | Hall Flex Life, Kilocycles |
|---|---|---|---|---|---|
| A | 1,350 | 345 | 740 | 92.5 | 360 |
| B | 1,255 | 260 | 845 | 93 | 417 |
| C | 1,370 | 320 | 875 | 92.5 | 456 |
| D | 1,365 | 245 | 1,025 | 94 | 495 |
| Control | 1,345 | 330 | 750 | 94 | 43 |

The control composition was prepared exactly as Compositions A, B, C and D except that it contained 100 parts of pale crepe, 40 parts of resinous copolymer and no rubbery copolymer. The results on the control represent the average of three separate determinations.

The Hall flex life test was carried out as specified in Specification 7/54 published by The British Boot, Shoe and Allied Trades Research Association. The remaining tests were carried out as described in British Standard 903/1950 published by The British Standards Institution.

EXAMPLE II

By way of comparison, a series of experiments were carried out to show the difference between the use of a rubbery copolymer of methyl methacrylate and butadiene 1,3 and a rubbery copolymer of styrene and butadiene 1,3. The rubbery copolymer of styrene and butadiene used was a GR–S synthetic rubber known to have a hydrocarbon content corresponding to approximately 23% by weight of styrene and 77% by weight of butadiene 1,3. The rubbery methyl methacrylate/butadiene 1,3 copolymer and the resinous styrene/butadiene 1,3 copolymer were each prepared exactly as described in Example I and were isolated as separate copolymers instead of as blends.

Several compositions were prepared containing natural rubber and the resinous copolymer together with in one case the rubbery copolymer of butadiene 1,3 and methyl methacrylate, and in the other the rubbery copolymer of butadiene 1,3 and styrene. The compositions were prepared according to the recipe set out in Example I except that the weight of resinous copolymer in each composition was 40 parts and the total weight of natural rubber plus rubbery copolymer was 100 parts.

Each composition was cured as in Example I and the following results were obtained after carrying out physical tests. The results are compared with the control composition described in Example I.

| Composition comprising— | | | | Tensile Strength, lbs./sq. inch | 100% Modulus, lbs./sq. inch | B.S. Hardness, degrees | Hall Flex Life, Kilocycles |
|---|---|---|---|---|---|---|---|
| Natural Rubber | Resinous Copolymer | Rubbery Copolymer of Butadiene 1,3 and Methyl Methacrylate | GR–S synthetic rubber | | | | |
| 100 | 40 | | | 1,345 | 750 | 94 | 43 |
| 90 | 40 | | 10 | 1,340 | 770 | 94 | 54 |
| 80 | 40 | | 20 | 1,350 | 805 | 93 | 235 |
| 70 | 40 | | 30 | 1,290 | 835 | 92 | 393 |
| 60 | 40 | | 40 | 1,360 | 825 | 91.5 | 1,272 |
| 90 | 40 | 10 | | 1,250 | 730 | 95 | 196 |
| 80 | 40 | 20 | | 1,345 | 845 | 95 | 450 |
| 70 | 40 | 30 | | 1,325 | 915 | 94 | 545 |
| 60 | 40 | 40 | | 1,400 | 980 | 94 | 600 |

These results show that the progressive replacement of part of the natural rubber by up to 40 parts of the rubbery copolymer of butadiene and methyl methacrylate brings a large increase in the resistance to flex cracking together with an increase in the 100% modulus with very little effect on the hardness. When part of the natural rubber is replaced instead by GR–S the improvement in flex cracking resistance and modulus is accompanied by a fall in the hardness. It should be noted that the improvement in the 100% modulus is appreciably smaller when GR–S is used than when corresponding, or even in some cases smaller amounts of the rubbery butadiene/methyl methacrylate copolymer is used. It should also be noted that when up to 30 parts of the rubbery butadiene/methyl methacrylate are used, the improvement in the resistance to flex cracking is much greater than when corresponding amounts of GR-S are used; in fact the use of only 10 parts of the rubbery copolymer of butadiene and methyl methacrylate gives an acceptable product whereas the use of 10 parts of GR-S does not.

I claim:
1. A composition comprising a mixture of (1) a resinous copolymer obtained by polymerizing a mixture having as the essential copolymerizable monomers butadiene 1,3 and styrene and containing at least 70% by weight of styrene based on the weight of the mixture of monomers, and (2) a rubbery copolymer obtained by polymerizing a mixture having as the essential copolymerizable monomers butadiene 1,3 and methyl methacrylate and containing at least 60% by weight of butadiene 1,3 based on the weight of the mixture of monomers and (3) natural rubber, there being for each 100 parts by weight of natural rubber in the mixture from 20 to 70 parts by weight of said resinous copolymer, and for each 100 parts by weight of said resinous copolymer from 25 to 150 parts of said rubbery copolymer.

2. A composition according to claim 1, in which said resinous copolymer (1) is obtained by polymerization of a mixture of styrene and butadiene 1,3 containing from 75 to 95% by weight of styrene based on the weight of the mixture of monomers.

3. A composition according to claim 1, in which said rubbery copolymer (2) is obtained by polymerization of a mixture of methyl methacrylate and butadiene 1,3 containing from 20 to 30% by weight of methyl methacrylate based on the weight of the mixture of monomers.

4. A vulcanized material comprising a vulcanized mixture of (1) a resinous copolymer obtained by polymerizing a mixture having as the essential copolymerizable monomers butadiene 1,3 and styrene and containing at least 70% by weight of styrene based on the weight of the mixture of monomers, and (2) a rubbery copolymer obtained by polymerizing a mixture having as the essential copolymerizable monomers butadiene 1,3 and methyl methacrylate and containing at least 60% by weight of butadiene 1,3 based on the weight of the mixture of monomers and (3) natural rubber, there being for each 100 parts by weight of natural rubber in the mixture from 20 to 70 parts by weight of said resinous copolymer, and for each 100 parts by weight of said resinous copolymer from 25 to 150 parts of said rubbery copolymer.

References Cited in the file of this patent
UNITED STATES PATENTS

| | | |
|---|---|---|
| 2,278,802 | Sarbach | Apr. 7, 1942 |
| 2,614,093 | Wheelock | Oct. 14, 1952 |
| 2,661,339 | Sparks et al. | Dec. 1, 1953 |
| 2,785,143 | Edgerley | Mar. 12, 1957 |